US012719656B2

(12) United States Patent
York et al.

(10) Patent No.: US 12,719,656 B2
(45) Date of Patent: Aug. 25, 2026

(54) ENHANCED CRYPTOGRAPHY SYSTEMS AND METHODS

(71) Applicant: Cummins Inc., Columbus, IN (US)

(72) Inventors: Christopher S. York, Greenwood, IN (US); Daniel Thomas Hackett, Columbus, IN (US); Gregory Khari Hinkson, Columbus, IN (US); Randall L. Wolf, Indianapolis, IN (US); Sharika K. Kumar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 162 days.

(21) Appl. No.: 18/565,340

(22) PCT Filed: May 27, 2022

(86) PCT No.: PCT/US2022/031453
§ 371 (c)(1),
(2) Date: Nov. 29, 2023

(87) PCT Pub. No.: WO2022/256268
PCT Pub. Date: Dec. 8, 2022

(65) Prior Publication Data

US 2024/0259177 A1 Aug. 1, 2024

Related U.S. Application Data

(60) Provisional application No. 63/195,080, filed on May 31, 2021.

(51) Int. Cl.
*H04L 9/00* (2022.01)
*G06F 8/00* (2018.01)
(Continued)

(52) U.S. Cl.
CPC ................ *H04L 9/002* (2013.01); *G06F 8/00* (2013.01); *G06F 8/51* (2013.01); *G06F 8/52* (2013.01);
(Continued)

(58) Field of Classification Search
CPC ..... G06F 8/00; G06F 8/51; G06F 8/52; G06F 21/14; G06F 21/57; G06F 21/101;
(Continued)

(56) References Cited

U.S. PATENT DOCUMENTS 9,053,325 B2 6/2015 Arora et al.
9,454,661 B2 9/2016 Chen et al.
(Continued)

FOREIGN PATENT DOCUMENTS

WO WO-03/103251 A1 12/2003
WO WO-2018/153559 A1 8/2018

OTHER PUBLICATIONS

"On the Security Goals of White-Box Cryptography"—Bock et al., TCHES vol. 2020, IACR, Mar. 2020 https://eprint.iacr.org/2020/104.pdf (Year: 2020).*
(Continued)

*Primary Examiner* — Randy A Scott
(74) *Attorney, Agent, or Firm* — Foley & Lardner LLP

(57) ABSTRACT

Methods and systems for extending white-box cryptography are provided. A computing device can maintain, in a memory, one or more cryptography keys encrypted using a white-box cryptography solution. The one or more cryptography keys encrypt or decrypt data with a cryptography algorithm not supported by the white-box cryptography solution. The computing device can perform one or more anti-tampering verifications to detect tampering events for tampering with the computing device or an application installed on the computing device. The computing device
(Continued)

can, upon determining that no tampering event is detected, decrypt the one or more cryptography keys using the white-box cryptography solution, and provide the one or more cryptography keys to encrypt or decrypt the data using the cryptography algorithm not supported by the white-box cryptography solution.

20 Claims, 4 Drawing Sheets

(51) Int. Cl.

| | |
|---|---|
| *G06F 8/51* | (2018.01) |
| *G06F 8/52* | (2018.01) |
| *G06F 21/10* | (2013.01) |
| *G06F 21/14* | (2013.01) |
| *G06F 21/57* | (2013.01) |
| *G06F 21/60* | (2013.01) |

(52) U.S. Cl.
CPC ............ *G06F 21/101* (2023.08); *G06F 21/14* (2013.01); *G06F 21/57* (2013.01); *G06F 21/602* (2013.01); *H04L 2209/16* (2013.01)

(58) Field of Classification Search
CPC ..... G06F 21/602; H04L 9/002; H04L 9/0894; H04L 2209/16
See application file for complete search history.

(56) References Cited

U.S. PATENT DOCUMENTS

| | | | | |
|---|---|---|---|---|
| 9,729,319 | B2 | 8/2017 | Circello et al. | |
| 10,412,054 | B2 * | 9/2019 | Michiels | H04L 63/0428 |
| 2011/0067012 | A1 * | 3/2011 | Eisen | G06F 21/57 713/189 |
| 2012/0179920 | A1 | 7/2012 | Farrugia et al. | |
| 2016/0048689 | A1 * | 2/2016 | Wiener | G06F 21/602 713/189 |
| 2016/0344545 | A1 | 11/2016 | Chou | |
| 2017/0098089 | A1 * | 4/2017 | Stewart | G06F 21/602 |
| 2018/0137272 | A1 | 5/2018 | Kamal | |
| 2021/0089655 | A1 * | 3/2021 | Whitmore | G06F 21/554 |

OTHER PUBLICATIONS

“On the Practical Security of White-Box Cryptography”—Junwei Wang, HAL Open Science, Sep. 30, 2020 https://theses.hal.science/tel-02953586/document (Year: 2020).*

International Search Report and Written Opinion on PCT App. No. PCT/US2022/031453 DTD Nov. 1, 2022, 9 pages.

* cited by examiner

ENHANCED CRYPTOGRAPHY SYSTEMS AND METHODS

CROSS REFERENCE TO RELATED APPLICATIONS

This application claims the benefit of and priority to U.S. provisional application No. 63/195,080, filed on May 31, 2021, and entitled "ENHANCED CRYPTOGRAPHY SYSTEMS AND METHODS," the content of which is incorporated herein by reference.

TECHNICAL FIELD

The present disclosure relates to enhancements or extensions to cryptography systems and methods. More specifically, the present disclosure relates to (i) systems and methods for extending benefits of white-box cryptography protections to unsupported algorithms, and (ii) systems and methods for extending secure storage in secure cryptoprocessors.

BACKGROUND

Systems employing cryptography to secure secret data may still be subject to attacks from intruders or hackers. Specifically, attackers may access the source code of an application employing cryptography, the object code of the application during runtime and/or the internal workings of the application to obtain or reconstruct decryption keys. The attackers can then use the decryption keys to decrypt the secret data. White-box cryptography systems or solutions obfuscate and embed secret (or decryption) keys within the application code in a way that the secret keys are neither expressed in the source code nor generated during runtime of the corresponding binary code. As such, attackers cannot obtain or reconstruct the secret keys even if they access the application source code or the corresponding binary code. Due to the obfuscation and intermingling of the secret keys with the application code, applications employing white-box mechanisms or techniques can be safely run even in an insecure environment.

Also, cryptoprocessors implementing cryptography solutions usually store or maintain secret keys in a secure memory of the cryptoprocessor. The secret keys are used only within the cryptoprocessor, and are not provided or released outside the cryptoprocessor. The confinement of the secret keys to the cryptoprocessor eliminates or mitigates chances of external access to secret keys.

SUMMARY

One embodiment relates to a method. The method includes maintaining, by a computing device in a memory, one or more cryptography keys encrypted using a white-box cryptography solution, the one or more cryptography keys to encrypt or decrypt data with a cryptography algorithm not supported by the white-box cryptography solution; performing, by the computing device, one or more anti-tampering verifications to detect tampering events for tampering with the computing device or an application installed on the computing device; and upon determining that no tampering event is detected, decrypting the one or more cryptography keys using the white-box cryptography solution and providing the one or more cryptography keys to encrypt or decrypt the data using the cryptography algorithm not supported by the white-box cryptography solution Another embodiment relates to an apparatus. The apparatus includes a processing circuit having a processor and a memory storing executable instructions, the executable instructions when executed by the processor cause the processing circuit to: maintain, in the memory, one or more decryption keys encrypted using a white-box cryptography mechanism, the one or more decryption keys decrypt data encrypted with an encryption algorithm not supported by the white-box cryptography mechanism; perform one or more anti-tampering verifications to detect tampering events for tampering with the apparatus or an application installed on the apparatus; and upon determining that no tampering event is detected, decrypt the one or more decryption keys using the white-box cryptography mechanism and provide the one or more decryption keys to decrypt the data encrypted with the encryption algorithm not supported by the white-box cryptography mechanism.

Still another embodiment relates to a computer-readable medium including computer code instructions stored thereon. The computer code instructions when executed by a processor cause the processor to: maintain, in a memory of a computing device, one or more decryption keys encrypted using a white-box cryptography mechanism, the one or more decryption keys to decrypt data encrypted with an encryption algorithm not supported by the white-box cryptography mechanism; perform one or more anti-tampering verifications to detect tampering events for tampering with the computing device or an application installed on the computing device; and upon determining that no tampering event is detected, decrypt the one or more decryption keys using the white-box cryptography mechanism, provide the one or more decryption keys to decrypt the data encrypted with the encryption algorithm not supported by the white-box cryptography mechanism Yet another embodiment relates to a method. The method includes a processing circuit maintaining, in a secure memory of a cryptoprocessor integrated in the processing circuit, a first set of cryptography resources, and maintaining, in a second memory of the processing circuit, an encrypted second set of cryptography resources. The method includes the processing circuit or the cryptoprocessor decrypting the second set of cryptography resources using at least one cryptography key from the first set of cryptography resources, and providing the decrypted second set of cryptography resources for use to encrypt or decrypt data. The method includes the processing circuit disabling debugging in the processing circuit.

In some implementations, the processing circuit includes an electronic control unit (ECU). In some implementations, disabling debugging in the processing circuit includes disabling a debugging port of the processing circuit. In some implementations, disabling debugging in the processing circuit includes turning off a debugger of the processing circuit in a production state of the processing circuit.

Another embodiment relates to an apparatus including a processing circuit. The processing circuit can include a cryptoprocessor integrated in the processing circuit. The cryptoprocessor can include a secure memory. The processing circuit or the cryptoprocessor can maintain, in a secure memory of the cryptoprocessor integrated in the processing circuit, a first set of cryptography resources, and can maintain, in a second memory of the processing circuit, an encrypted second set of cryptography resources. The cryptoprocessor can decrypt the second set of cryptography resources using at least one cryptography key from the first set of cryptography resources, and provide the decrypted second set of cryptography resources for use to encrypt or decrypt data. The processing circuit or the cryptoprocessor can disable debugging in the processing circuit.

In some implementations, the processing circuit can include an electronic control unit (ECU). In some implementations, disabling debugging in the processing circuit can include disabling a debugging port of the processing circuit. In some implementations, disabling debugging in the processing circuit can include turning off a debugger of the processing circuit in a production state of the processing circuit.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
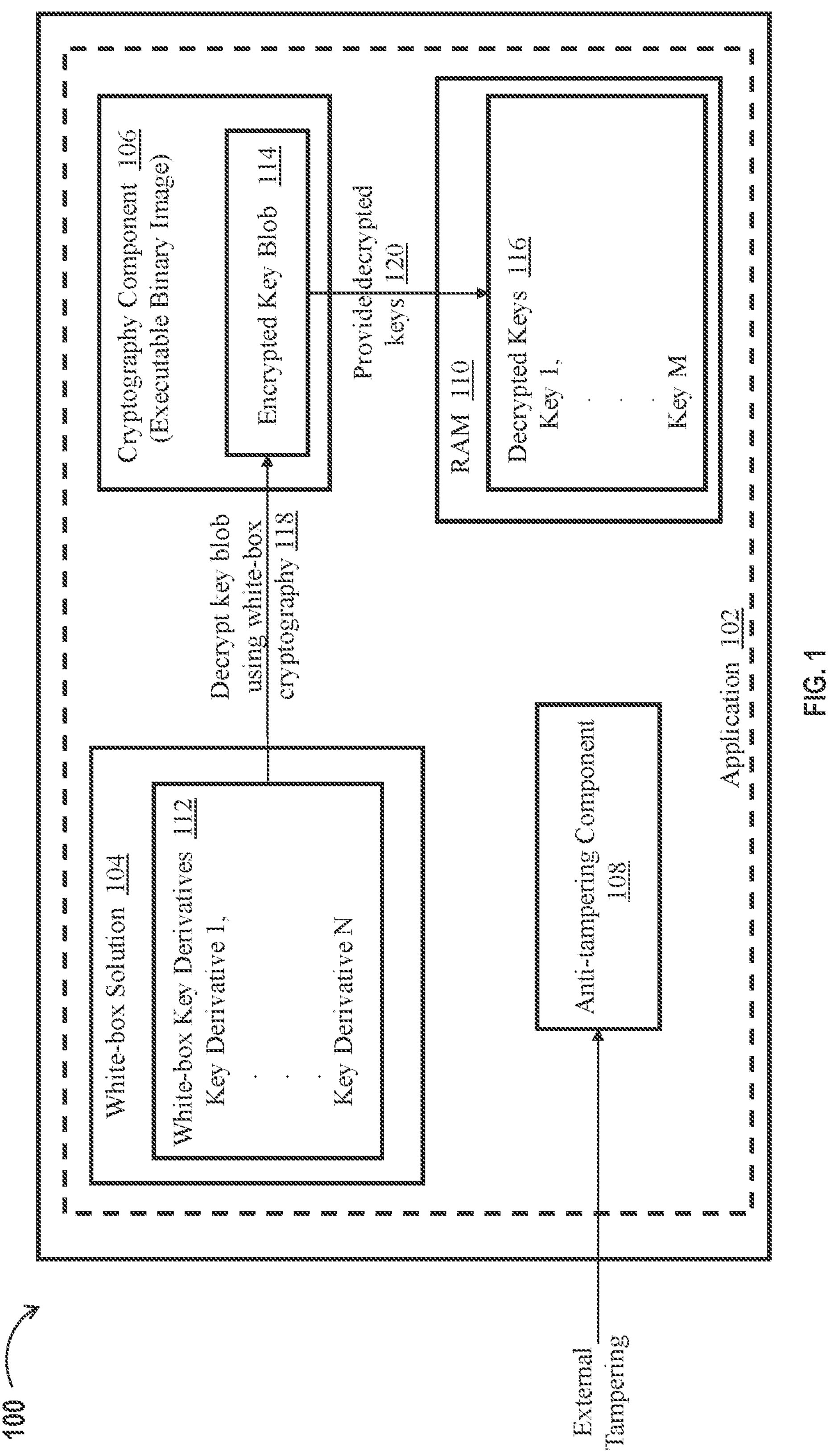
FIG. 1 is a block diagram of a computing device implementing a proposed approach for extending benefits of white-box cryptography protections to unsupported algorithms, according to an example embodiment.

Existing data security and/or cryptography systems suffer various limitations. Embodiments in the current disclosure address at least two technical problems that arise in cryptography systems and methods. A first technical problem is associated with white-box cryptography. Specifically, while the white-box cryptography mechanism or solutions provide enhanced security of secret keys, not all encryption algorithms are supported by white-box cryptography. Some of the embodiments described herein allow for extending benefits of white-box cryptography protection to encryption/decryption algorithms that are not supported by white-box cryptography. A second technical problem relates to limited secure storage in cryptoprocessors. In particular, the secure memory or storage in cryptoprocessors for storing secret keys or other secret information is usually very limited and can store only a predefined number of keys or a predefined amount of information that may not be sufficient to store all secret keys or secret information in some practical scenarios. Some of the embodiments described herein allow for extending secure storage in secure cryptoprocessors.

Extending Benefits of White-Box Cryptography Protection to Unsupported Algorithms When a cryptographic algorithm is implemented in a source code, e.g., as part of an application, a corresponding cryptographic key (or secret key) is usually retrieved at runtime from memory and passed to an encryption or decryption algorithm. At such point in time, a hacker can obtain the cryptographic key if the hacker gains access to the executing code or related data at runtime. The cryptography key can be stored in memory at runtime or can be stored as part of the binary code.

White-box cryptography addresses the above discussed weakness or vulnerability, and improves the security of cryptography keys. White-box cryptography never exposes the cryptography key in memory or in the binary code. Instead, white-box cryptography solutions obfuscate, obscure and/or intermingle together the key and the encryption or decryption algorithm so that one cannot reconstruct the cryptography key even when accessing the executing code or the related execution data associated with an encryption event or a decryption event. White-box cryptography solutions can keep a derivative (or transformation) of the cryptography key for use to encrypt or decrypt data. Even if a hacker was to attach a debugger to device executing the white-box cryptography algorithm(s), the hacker would not be able to recover the cryptography key.

One limitation of white-box cryptography is that any white-box cryptography solution does not support all encryption or decryption algorithms. The white-box cryptography solution, or the corresponding library, supports a limited set of cryptographic algorithms with corresponding cryptographic keys obfuscated therewith. Many companies or entities have legacy or proprietary systems (or applications) that use cryptographic algorithms which are not supported by any of the existing white-box cryptography solutions.

Systems and methods described herein allow for extending the benefits (e.g., the enhanced security of secret keys) of white-box protection to cryptography algorithms not supported by white-box cryptography solutions. Specifically, cryptographic algorithms supported by white-box cryptography can be used as intended and also to encrypt and/or decrypt the secret keys of unsupported cryptographic algorithms. In addition anti-tampering technologies can be used to prevent or mitigate potential access to the secret keys of unsupported cryptographic algorithms when decrypted by white-box cryptographic algorithms. In other words, the systems and methods described herein can be viewed as comprising two main components; a cryptographic component or module to encrypt and/or decrypt secret keys associated with unsupported algorithms using white-box cryptography, and an anti-tampering module or component for checking or detecting tampering with the computing device, or any application installed thereon, that implements the proposed approach for extending the benefits of white-box protection to unsupported cryptography algorithms.

Referring to FIG. 1, a block diagram of a computing device 100 implementing a proposed approach for extending benefits of white-box cryptography protections to unsupported algorithms is shown, according to an example embodiment. In brief overview, the computing device 100 can include an application 102 installed thereon. The application 102 can include, or can have access to (e.g., via one or more application programming interfaces (APIs)), a white-box solution (or library) 104, a cryptography component 106 and an anti-tampering component 108. The application 102 can have access to, or store data in, a random access memory (or other memory) 110 of the computing device 100. The white-box solution 104 can include one or more white-box cryptography key derivatives 112, denoted as Key Derivative 1, . . . , Key Derivative N. The cryptography component 106 can include an encrypted key blob, or an encrypted set of keys, 114 (e.g., an encrypted set of legacy keys). The encrypted set of keys 114 can represent cryptography keys associated with cryptographic algorithms not supported by the white-box solution 104 or the corresponding library. The encrypted set of keys 114 can be encrypted using an encryption algorithm supported by the by the white-box solution 104 or the corresponding library. Once the encrypted set of keys 114 are decrypted, the corresponding decrypted keys 116 (e.g., legacy keys), denoted herein as Key 1, . . . , Key M, can be provided to the RAM 110 for storing thereon.

Figure 2:
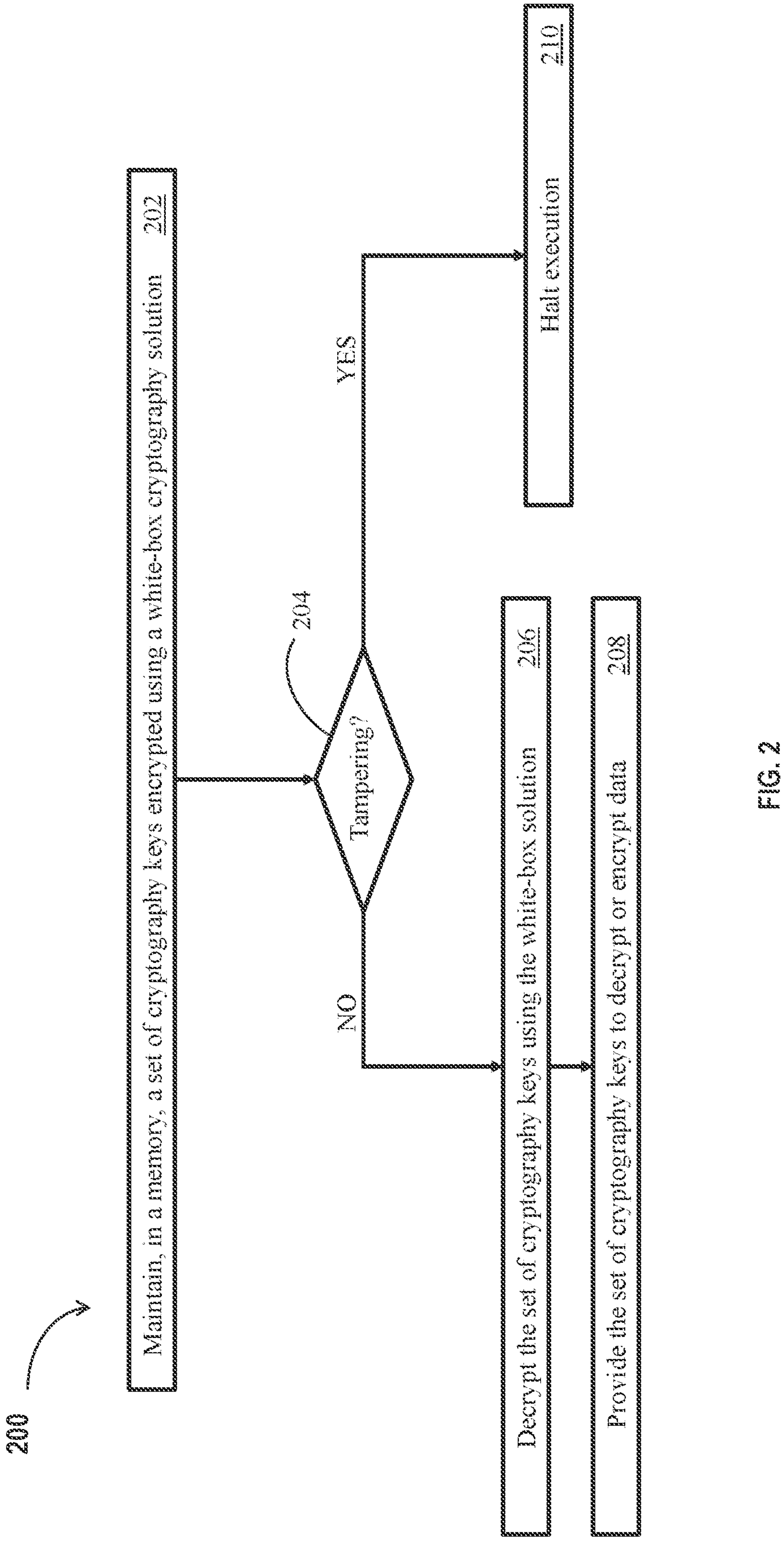
FIG. 2 is a flowchart illustrating a method for extending benefits of white-box cryptography protections to unsupported algorithms, according to an example embodiment.

Referring to FIG. 2, a flowchart illustrating a method 200 for extending benefits of white-box cryptography protection to unsupported algorithms is shown, according to an example embodiment. In brief overview, the method 200 can include maintaining, in a memory, one or more cryptography keys encrypted using a white-box cryptography solution (STEP 202), and checking for tampering events (DECISION BLOCK 204). The method 200 can include decrypting the one or more cryptography keys using the white-box cryptography solution (STEP 206) and providing the one or more cryptography keys to decrypt data encrypted with an encryption algorithm not supported by the white-box cryptography solution (STEP 208), upon determining that no tampering event is detected. The method 200 can include halting execution of an application of a software integrating the steps of method 200 upon detecting a tampering event (STEP 210).

Referring now to FIGS. 1 and 2, the computing device 100 can include a software application 102 that integrates the cryptography component 106 and the anti-tampering component 108. Both components 106 and 108 can be implemented as a single software module that can be integrated in various software applications or programs. The software application 102 can integrate, or can have access via one or more APIs to, the white-box solution 104. The white-box solution 104, the cryptography component 106 and the anti-tampering component 108 can be executed by a processor (not shown in FIG. 1) of the computing device 100.

The computing device 100 or the processor thereof can maintain, in a memory, a set of encrypted cryptography keys 114 that are encrypted using the white-box solution 104 (STEP 202). The computing device 100 or the processor, upon executing the cryptography component 106, can encrypt a set of cryptography (or secret) keys 116 using an encryption algorithm supported by the white-box solution 104, and store the corresponding encrypted keys 114 in a memory of the computing device 100. The processor can store or maintain the encrypted keys 114 in a flash memory of the processor, e.g., with a source or binary code of the cryptography component 106. The processor may store or maintain the encrypted cryptography keys in the RAM 110. The cryptography keys 116 can be associated (or for use) with one or more cryptography algorithms not supported by the white-box solution 104. In other words, the cryptography keys 116 can be encryption keys or decryption keys for encrypting or decrypting data using encryption/decryption algorithm(s) not supported by the white-box solution 104.

The processor, or the computing device 100, can execute the anti-tampering component 108 to perform one or more anti-tampering verifications to detect tampering events for tampering with the computing device 100 or an application 102 installed on the computing device (DECISION BLOCK 204). The one or more anti-tampering verifications can include at least one of an anti-debug verification (or check), an anti-root verification, an anti-jailbreak verification, an anti-hooking verification or a build-time integrity verification.

When performing the anti-debug verification, the processor or the computing device 100 checks whether a debugger is attached to the computing device 100, the application 102 or any component thereof. A hacker may attach a debugger to determine or access the cryptography key(s) 116 once decrypted by the cryptography component 106. To avoid such possibility, the anti-tampering component 108 when executed can halt execution (or prevent initiation) of the application 102 if a debugger is detected (STEP 210).

In the case where the computing device 100 is a Linux device (e.g., an Android device), the root is a special account which provides system administrator privileges across the whole system or the whole computing device 100. The anti-root verification includes the processor checking whether the computing device 100 was tampered with to cause the operating system to run as root and give the user of the computing device 100 elevated privileges for processes. Under root privileges, the user would have more privileges than the device was originally intended for. Root privileges give the user full access to all of the operating system, and the user can make changes and access various processes. Upon detecting a tampering event that causes the operating system of the computing device 100 to run as root, the anti-tampering component 108, when executed, can cause the processor to halt execution (or prevent initiation) of the application 102 (STEP 210).

The anti-jailbreak verification is conceptually equivalent to anti-root verification, but for Apple computing devices. In other words, hackers root Linux devices but jailbreak Apple devices. The technologies used to achieve each of these tampering events are different, and so are the techniques for checking for or detecting each of these tampering events. The anti-tampering component 108, when executed, can cause the processor to check for tampering events to jailbreak the computing device 100 (for an Apple device), and halting execution (or preventing initiation) of the application 102 upon detecting such an event (STEP 210).

For build-time integrity verification, the anti-tampering component 108, when executed, can cause the processor to check whether the application 102 was tampered with post build. The processor can check, at runtime, a signature of the application to determine whether the application was modified after it was compiled. The processor can halt execution (or prevent initiation) of the application 102 upon detecting a build-time integrity failure (STEP 210).

For anti-hooking verification, the anti-tampering component 108, when executed, can cause the processor to check whether the computing device 100 or the application 102 has been tampered with to include a hook code to intercept function calls, events and/or messages between different software components. The processor can halt execution (or prevent initiation) of the application 102 upon detecting hooking event (STEP 210).

When executed, the anti-tampering component 108 can cause the processor to periodically perform the one or more anti-tampering verifications during the execution of the application 102. For instance, the processor can perform the anti-tampering verifications before, during, and after decryption of the encrypted key blob 114. If at any point in time a tampering event is detected, the processor can automatically stop execution (or initiation) of the application 102 on the computing device 100 (STEP 210).

If no tampering event is detected, the processor can decrypt the one or more encrypted cryptography keys 114 using the white-box cryptography solution (STEP 206 and Arrow 118), and provide the decrypted cryptography keys for use with a cryptography algorithm not supported by the white-box solution 104 to encrypt or decrypt data (STEP 208 and Arrow 120). The processor can use a decryption algorithm supported by the white-box solution 104 (and a corresponding key derivative) to decrypt the encrypted cryptography keys 114 associated with the unsupported cryptography algorithm. When the encrypted cryptography keys 114 are decrypted, the processor can pass the corresponding decrypted keys 116 to the RAM 110 or other memory of the computing device 100. The processor can further use the decrypted keys 116 and the corresponding unsupported cryptography algorithm to encrypt or decrypt data. Note that the cryptography keys 116 can be encryption keys or decryption keys.

Considering the approach described above, which involves encryption of non-white-box cryptography keys with the white-box solution and applying anti-tampering procedures, the unsupported cryptography algorithm and the corresponding cryptography key(s) 116 can enjoy similar protection or security as that provided by the white-box solution 104. Specifically, when the application 102 is not being executed, the cryptography keys are maintained in encrypted form 114 using white-box supported encryption. Since white-box cryptography keys are never exposed, a hacker would not be able to decrypt the encrypted keys 114 if they access the source or binary code of the application 102. During runtime when the cryptography key(s) 116 associated with the unsupported cryptography algorithm may be store in decrypted form, the anti-tampering component 108 prevents execution of the application if any tampering event is detected, therefore, preventing access to the decrypted cryptography keys 116.

While the embodiments associated with FIGS. 1 and 2 are described in terms of encrypting a cryptography key blob 114 using the white-box solution 104, the same approach can be used for other secret information e.g., other than cryptography keys. For instance, the secret information that can be encrypted using the white-box solution 104 can include digital or security certificates, signatures or other secret information or data.

The computing device 100 can include a mobile device, a smart phone, a tablet device, a smart watch, a desktop, a laptop, a computer server or an electronic control unit (ECU) of a vehicle. The computing device 100 can have a Linux or Android operating system, an iOS, a Windows operating system or other operating system. The application 102 can be downloaded from an online application store and installed on the computing device 100.

Extending Secure Storage on Secure Cryptoprocessors

Secure built-in cryptoprocessors, such as but not limited to hardware security modules (HSMs), secure hardware extension (SHE) specification based units or cryptographic service engine (CSEs) units usually have a secure memory for storing cryptography keys or other secret information. However, such secure memory is usually limited and can store only a limited amount of security data. For instance, some secure cryptoprocessors can only store 25 or 30 cryptography keys. Such secure storage limitation puts a constraint on the number of protection or cryptography mechanisms that can be used. For example, such cryptoprocessors are used in some ECUs therefore limiting the number of protection or cryptography mechanisms, such as legacy mechanisms, that can be used in the ECUs. For digital signature processing and other encryption or decryption needs call for more keys in the ECU than what could be stored in the secure memory of a secure cryptoprocessor.

To overcome the above described technical problem, embodiments described herein allow for extending secure storage in secure cryptoprocessors, and therefore increasing the number of protection or cryptography mechanisms that can be used. In particular, additional cryptography or secret information, other than cryptography keys stored in the secure cryptoprocessor, can be stored in another memory in encrypted form. The additional cryptography or secret information can be decrypted using one or more of the cryptography keys stored in the secure cryptoprocessor. Also, debugging can be disabled to prevent access of the additional cryptography or secret information when decrypted.

Figure 3:
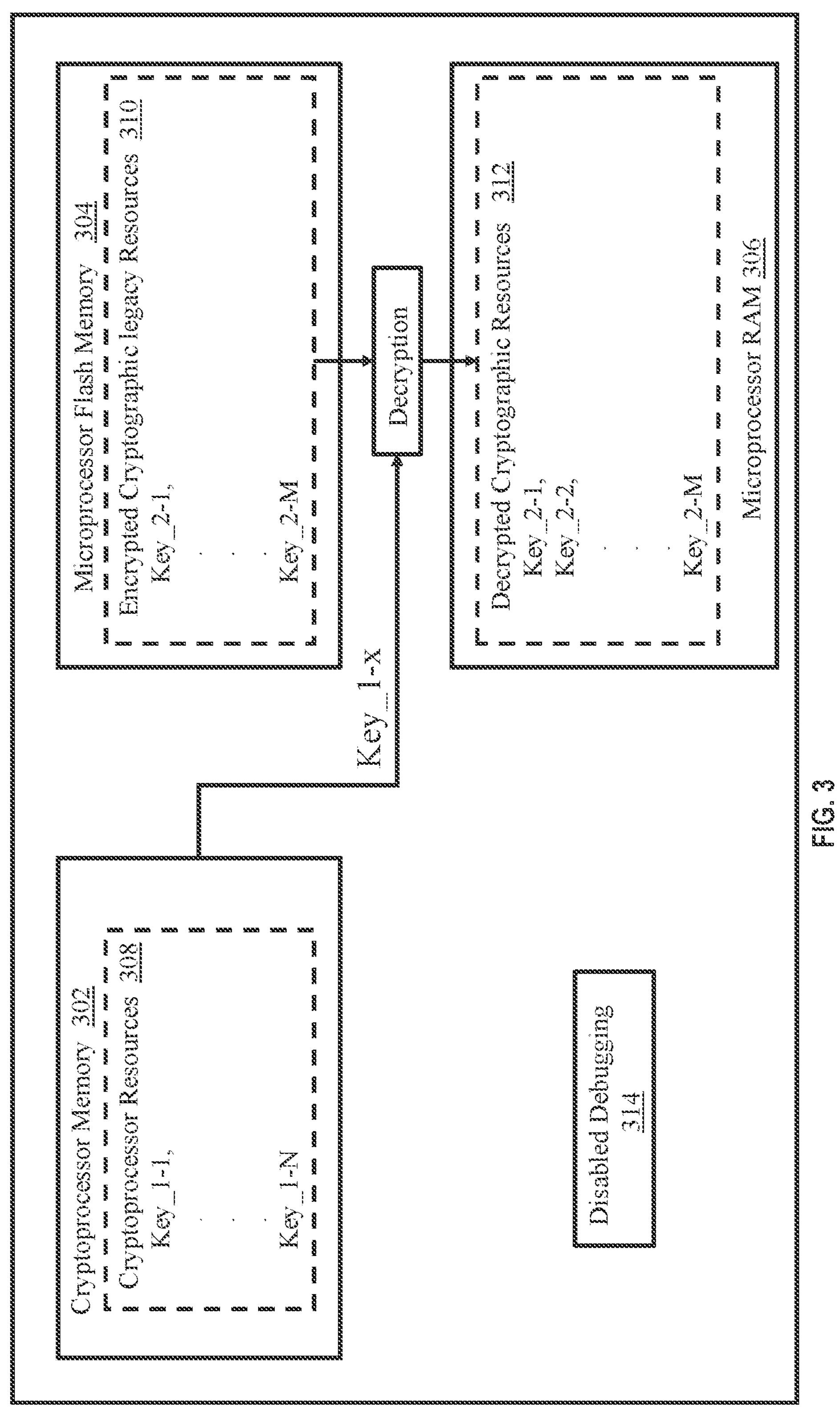
FIG. 3 is a block diagram of a cryptography system extending secure storage in secure cryptoprocessors, according to an example embodiment.

Referring to FIG. 3, a block diagram of a processing circuit (or microprocessor) 300 structured to secure storage in secure cryptoprocessors is shown, according to an example embodiment. The processing circuit 300 can include a cryptoprocessor secure memory 302, a flash memory 304 and a RAM 306. The cryptoprocessor secure memory 302 can store a first set of cryptography resources 308, such as the cryptography keys Key_1-1, . . . , Key_1-N. The flash memory 304 can store additional encrypted cryptography resources 310, such as the second set of cryptography keys denoted Key_2-1, . . . , Key_2-M, which is stored in encrypted form. The cryptoprocessor can encrypt the second set of cryptography keys Key_2-1, . . . , Key_2-M using one or more encryption algorithms associated with one or more cryptography keys of the first set of cryptography resources 308 stored in the cryptoprocessor secure memory 302. The processing circuit (or microprocessor) 300 can be structured or configured to disable debugging 314.

Figure 4:
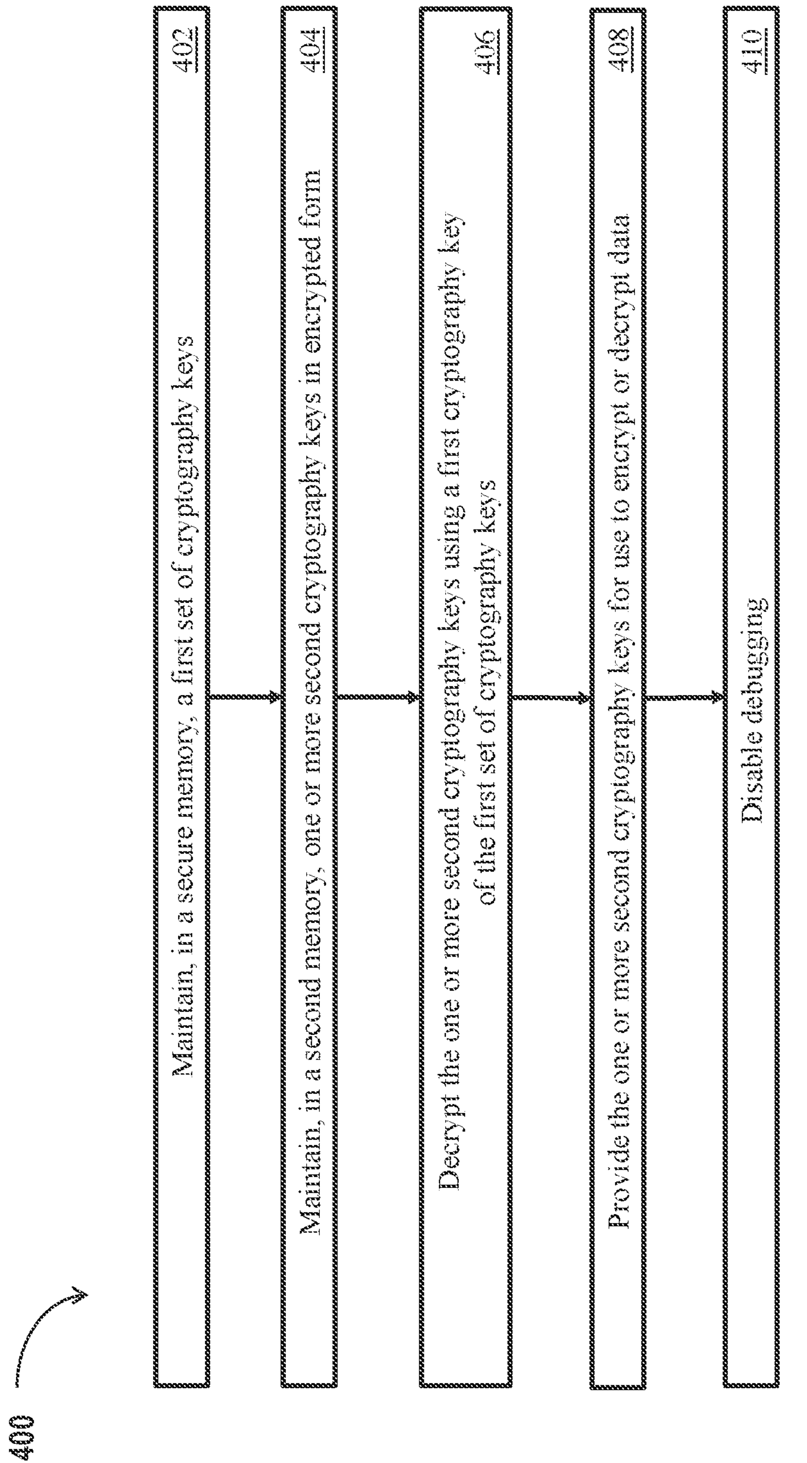
FIG. 4 is a flowchart of a method for extending secure storage in secure cryptoprocessors, according to an example embodiment.

Referring to FIG. 4, a flowchart of a method 400 for extending secure storage in secure cryptoprocessors, is shown according to an example embodiment. In brief overview, the method 400 can include maintaining, in a first secure memory (e.g., of a secure cryptoprocessor), a first set of cryptography keys (STEP 402), and maintaining in a second memory an encrypted second set of cryptography keys (STEP 404). The method 400 can include decrypting the encrypted second set of cryptography keys using one or more first cryptography keys of the first set of cryptography keys (STEP 406), and providing the decrypted second set of cryptography keys for use to encrypt or decrypt data (STEP 408). The method 400 can include disabling debugging of a processing circuit including the cryptoprocessor or a memory storing the decrypted second set of cryptography keys (STEP 410). An apparatus, e.g., a computing device, can include the processing circuit (or microprocessor) 300 or the processing circuit 300 can perform the method 400 described in FIG. 4.

Referring now to FIGS. 3 and 4, the cryptoprocessor can encrypt the second set of cryptography keys, or more generally a second set of secret information, using one or more encryption algorithms associated with one or more first cryptography keys of the first set of cryptography keys maintained in the cryptoprocessor. The processing circuitry 300 or the cryptoprocessor can maintain the encrypted second set of cryptography keys, or encrypted second set of secret information, in the flash memory 304 (STEP 404). The first set of cryptography keys or the first set of cryptography resources 308 would not be available to anyone and hence cannot be leaked by anyone. As a result, requests for any key (or any information) of the first set of cryptography keys or the first set of cryptography resources 308 from any agency can be denied based, e.g., as not available.

The crypto processor can decrypt the encrypted second set of cryptography keys, or encrypted second set of secret information, using one or more first cryptography keys of the first set of cryptography keys maintained by the cryptoprocessor (STEP 406). For instance, the cryptoprocessor can decrypt the encrypted second set of cryptography keys, or encrypted second set of secret information, using a first cryptography key K_1-*x*. The decryption is performed within the cryptoprocessor so that the first cryptography key K_1-*x* (or any cryptography key of the first set of cryptography keys) is always maintained within the cryptoprocessor. The decrypted second set of cryptography keys, or decrypted second set of secret information, can be stored in the RAM 306 (or other memory) for use to encrypt or decrypt data.

Disabling debugging of the processing circuit (or microprocessor) 300 or the RAM 306 can include disabling a debug port (e.g., JTAG port, NEXUS port or other debug port) of the processing circuit (or microprocessor) 300 during production to prevent external access (e.g., by hackers) to the RAM 306, and therefore prevent access to the decrypted second set of cryptography keys, or decrypted second set of secret information, maintained in the RAM 306. In some implementations, the debugger can be turned off in the processing circuit (or microprocessor) 300 when going from pre-production phase/state to production phase/state. The debugger can be turned on in the processing circuit (or microprocessor) 300 to go from production state to diagnosis state. However, in such case the processing circuit (or microprocessor) 300 cannot be used in production anymore as the security of the second set of cryptography keys, or second set of secret information, is compromised when the debugger is turned on.

The approach described above in relation with FIGS. 3 and 4 allows for using additional cryptography information outside the crypto processor in secure manner by using one or more cryptography keys maintained in the cryptoprocessor to encrypt or decrypt the additional cryptography information. The encrypted additional cryptography information can be maintained in another memory, e.g., flash memory 304, outside the cryptoprocessor. The disabling of the debugger in the processing circuit (or microprocessor) 300 prevents access to the additional cryptography information, especially when in decrypted form. Accordingly, the approach discussed above can be viewed as extending secure storage of cryptography (or secret) information in association with a cryptoprocessor.

In some implementations, the processing circuit (or microprocessor) 300 can include an ECU, and the above discussed approach provides improved cybersecurity using limited existing resources in ECUs. Without storing the first key in the cryptoprocessor and disabling debugging, a hacker could reverse engineer (or de-obfuscate) the second set of cryptography information or keys from the flash memory 304 or access the second set of cryptography information or keys in memory (e.g., RAM 306) at runtime.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples). It is important to note that the construction and arrangement of the apparatus and system as shown in the various exemplary embodiments is illustrative only. Additionally, any element disclosed in one embodiment may be incorporated or utilized with any other embodiment disclosed herein. Moreover and although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the apparatus/computing device (e.g., controller 104), partly on the apparatus/computing device (e.g., controller), as a stand-alone computer-readable package, partly on the apparatus/computing device and partly on a remote computer or entirely on the remote computer or server. In the latter scenario and as described above, the remote computer may be connected to the apparatus/computing device (e.g., controller) through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

What is claimed:

1. A method, comprising:

maintaining, by a computing device in a secure memory, a first set of one or more cryptography keys;

maintaining, by the computing device in a second memory, a second set of one or more cryptography keys encrypted using a white-box cryptography solution, the second set of one or more cryptography keys configured to encrypt or decrypt data with a cryptography algorithm not supported by the white-box cryptography solution;

performing, by the computing device, one or more anti-tampering verifications to detect tampering events for tampering with the computing device or an application installed on the computing device;

upon determining that a tampering event is detected, preventing execution of the application or preventing access to decrypted cryptography keys; and upon determining that no tampering event is detected, decrypting, within the secure memory, the second set of one or more cryptography keys using the white-box cryptography solution and the first set of one or more cryptography keys; and providing access to the decrypted second set of one or more cryptography keys to encrypt or decrypt the data using the cryptography algorithm not supported by the white-box cryptography solution.

2. The method of claim 1, comprising:

encrypting the second set of one or more cryptography keys using the white-box cryptography solution and the first set of one or more cryptography keys.

3. The method of claim 1, wherein the one or more anti-tampering verifications include at least one of an anti-debug verification or an anti-root verification.

4. The method of claim 1, wherein the one or more anti-tampering verifications include at least one of an anti-jailbreak verification or anti-hooking verification.

5. The method of claim 1, wherein the one or more anti-tampering verifications include a build-time integrity verification.

6. The method of claim 1, wherein performing the one or more anti-tampering verifications includes performing the one or more anti-tampering verifications periodically.

7. The method of claim 1, comprising:

halting, by the computing device, execution of the application installed on the computing device upon detecting a tampering event.

8. The method of claim 1, further comprising encrypting or decrypting the data using the second set of one or more cryptography keys.

9. The method of claim 1, further comprising:

upon decrypting the second set of one or more cryptography keys, storing the second set of one or more cryptography keys in a third memory of the computing device;

wherein the second set of one or more cryptography keys is provided from the third memory to encrypt or decrypt the data.

10. An apparatus, comprising:

a processing circuit having a processor, a secure memory, and a second memory storing executable instructions, the executable instructions when executed by the processor cause the processing circuit to:

maintain, in the secure memory, a first set of one or more decryption keys;

maintain, in the second memory, a second set of one or more decryption keys encrypted using a white-box cryptography mechanism, the second set of one or more decryption keys configured to decrypt data encrypted with an encryption algorithm not supported by the white-box cryptography mechanism;

perform one or more anti-tampering verifications to detect tampering events for tampering with the apparatus or an application installed on the apparatus;

upon determining that a tampering event is detected, preventing execution of the application or preventing access to decrypted cryptography keys; and upon determining that no tampering event is detected, decrypt, within the secure memory, the second set of one or more decryption keys using the white-box cryptography mechanism and the first set of one or more decryption keys; and provide access to the decrypted second set of one or more decryption keys to decrypt the data encrypted with the encryption algorithm not supported by the white-box cryptography mechanism.

11. The apparatus of claim 10, wherein the executable instructions when executed by the processor, further cause the processing circuit to:

encrypt the second set of one or more decryption keys using the white-box cryptography mechanism and the first set of one or more decryption keys.

12. The apparatus of claim 10, wherein the one or more anti-tampering verifications include an anti-debug verification.

13. The apparatus of claim 10, wherein the one or more anti-tampering verifications include an anti-root verification.

14. The apparatus of claim 10, wherein the one or more anti-tampering verifications include at least one of an anti-jailbreak verification or anti-hooking verification.

15. The apparatus of claim 10, wherein the one or more anti-tampering verifications include a build-time integrity verification.

16. The apparatus of claim 10, wherein, in performing the one or more anti-tampering verifications, the executable instructions when executed by the processor further cause the processing circuit to perform the one or more anti-tampering verifications periodically.

17. The apparatus of claim 10, wherein the executable instructions when executed by the processor further cause the processing circuit to halt execution of the application installed on the apparatus upon detecting a tampering event.

18. The apparatus of claim 10, wherein the executable instructions when executed by the processor further cause the processing circuit to encrypt the data using the second set of one or more decryption keys.

19. The apparatus of claim 10, comprising at least one of:

a mobile device;

a laptop device;

a desktop; or an engine control unit.

20. A non-transitory computer-readable storage medium including computer code instructions stored thereon, the computer code instructions when executed by a processor cause the processor to perform operations comprising:

maintaining, in a secure memory of a computing device, a first set of one or more decryption keys;

maintaining, in a second memory of the computing device, a second set of one or more decryption keys encrypted using a white-box cryptography mechanism, the second set of one or more decryption keys configured to decrypt data encrypted with an encryption algorithm not supported by the white-box cryptography mechanism;

performing one or more anti-tampering verifications to detect tampering events for tampering with the computing device or an application installed on the computing device;

upon determining that a tampering event is detected, preventing execution of the application or preventing access to decrypted cryptography keys; and upon determining that no tampering event is detected, decrypting, within the secure memory, the second set of one or more decryption keys using the white-box cryptography mechanism and the first set of one or more decryption keys; and providing access to the decrypted second set of one or more decryption keys to decrypt the data encrypted with the encryption algorithm not supported by the white-box cryptography mechanism.

* * * * *